United States Patent [19]

Giachino et al.

[11] Patent Number: 4,768,751

[45] Date of Patent: Sep. 6, 1988

[54] SILICON MICROMACHINED NON-ELASTIC FLOW VALVES

[75] Inventors: Joseph M. Giachino, Farmington Hills; William F. Horn, Plymouth; Robert C. Gardner, Taylor, all of Mich.

[73] Assignee: Ford Motor Company, Dearborn, Mich.

[21] Appl. No.: 109,976

[22] Filed: Oct. 19, 1987

[51] Int. Cl.⁴ .............................. F16K 7/14; B05B 1/02
[52] U.S. Cl. ..................................... 251/331; 251/368; 29/157 C; 29/157.1 R; 29/DIG. 16; 239/102.1
[58] Field of Search .............. 251/331, 368; 29/157 C, 29/DIG. 16, 157.1; 239/102.1

[56] References Cited

U.S. PATENT DOCUMENTS

| | | |
|---|---|---|
| 1,243,122 | 10/1917 | Winters . |
| 3,921,916 | 11/1975 | Bassous ............................ 239/102 |
| 4,157,935 | 6/1979 | Solyst . |
| 4,455,192 | 6/1984 | Tamai . |
| 4,538,642 | 9/1985 | Schutten et al. . |
| 4,581,624 | 4/1986 | O'Connor ...................... 137/831 X |
| 4,628,576 | 12/1986 | Giachino et al. . |
| 4,647,013 | 3/1987 | Giachino et al. . |

OTHER PUBLICATIONS

"Fabrication of Novel Three-Dimensional Microstructures by the Anisotropic Etching of (100) and (110) -Silicon", by E. Bassous, IEEE Transactions on Electron Devices, vol. ED-25, No. 10, Oct. 1978, pp. 1178–1185.

Primary Examiner—Arnold Rosenthal
Attorney, Agent, or Firm—Peter Abolins; Keith L. Zerschling

[57] ABSTRACT

A valve assembly for controlling fluid flow includes a valve plate and a nozzle plate which are not attached to each other but can be moved into and out of contact with each other. The valve plate has an opening for passing an actuator and fluid. A nozzle plate has an opening for passing fluid and the opening is aligned with a mesa on the valve plate which can seal the nozzle orifice. The actuator separates the nozzle plate from the valve plate to permit fluid flow and a spring means brings the nozzle plate into a closed position against the valve plate to stop fluid flow.

4 Claims, 3 Drawing Sheets

SILICON MICROMACHINED NON-ELASTIC FLOW VALVES

This disclosure relates to copending patent application 86-79(I) entitled Silicon Micromachined Elastic Flow Valves.

BACKGROUND OF THE INVENTION

1. Field of the Invention

This invention relates to a structure of a silicon valve.

2. Prior Art

An article entitled "Fabrication of Novel Three-Dimensional Microstructures by the Anisotropic Etching of (100) and (110) Silicon", by E. Bassous, IEEE Transactions on Electron Devices, Vol. ED-25, No. 10, October 1978, pages 1178-85 teaches the use of anisotropic etching of single crystal silicon to make ink jet nozzles, optical waveguides, multisocket miniature electrical connectors and electromechanical devices.

U.S. Pat. Nos. 4,157,935 issued to Solyst and 4,455,192 issued to Tamai teach methods of forming an ink jet nozzle array by chemical etching of a silicon wafer.

It is also known to fabricate conventional metal fluid metering valves such as those using matched fittings of very precisely machined metal components. Typical tolerances of the lapped machine parts are in the millionths of an inch. This is a complicated, labor-intensive, time-consuming manufacturing process yielding components which are expensive and subject to reliability problems as the internal tolerances change due to wear and exposure to fuel and fuel contaminants. It would be desirable to fabricate fuel injectors and other valves with substantially less labor and time using a significantly less complicated manufacturing process. That is, superior tolerances are desirable as in an insensitivity to fuel contaminants and improved reliability.

Further, it is also known to use a silicon valve for controlling the flow of fluid using first and second silicon members. The first silicon member is generally planar and has an orifice for passing the fluid. The second silicon member has a planar silicon surface aligned with, and relatively moveable to, the orifice for selectively opening and closing the orifice thereby controlling flow of fluid through the orifice. Such a silicon valve and method for fabricating it are further described in U.S. Pat. Nos. 4,628,576 issued Dec. 16, 1986 and 4,647,013 issued Mar. 3, 1987, both assigned to the assignee hereof.

U.S. Pat. No. 1,243,122 discloses a valve which is used to vaporize a gasoline and air mixture as the mixture leaves the carburetor of an engine. FIG. 1 of that patent illustrates the valve comprising perforated plates 10, 12 positioned to receive the gasoline and air mixture from the carburetor 6. The plates 10, 11 are normally held against one another with the perforations in each plate offset to block any flow through the valve. When a partial vacuum is formed in manifold 5, the plate 12 moves away from the fixed plate 10 thereby vaporizing the fuel mixture as seen in FIG. 3 of that patent. This reference neither teaches nor suggests the use of silicon to construct a valve.

U.S. Pat. No. 4,538,642 discloses a valve which, as seen in FIG. 1, includes an electrically conductive sheet-like member 4 provided with an electrically insulative face surface 6 and an array of apertures 7-11. A second electrically conductive sheet-like member 12 abuts the first member 4 at face surface 6 to close off apertures 7-11. The second sheet-like member 12 has apertures 16-13 which are non-aligned with the apertures 7-11. To open the valve, switch 28 is closed, causing electric current to pass through member 4, then through conductor 26, and then through member 12 to produce opposing electromagnetic fields to raise the sheet members 4, 6 as seen in FIG. 3. Again, there is no teaching or suggestion of using silicon to construct the valve.

The above prior art has shown that precise control of fluid flow, including gaseous, liquid or vacuum, is very difficult to achieve. The conventional approach using metal valve systems requires precise machining on very small components. Valve to valve variability is very difficult to control and the total operation is very expensive. These metal valves usually include a metal housing and pintle and are susceptible to clogging by very small foreign matter introduced through the fluids. Other approaches now in use include injection molding of a plastic valve seat against which a rubber-tipped plunger is forced to effect closure. This type of valve is subject to sticking due to environmental conditions such as very low temperature. Simpler actuation and improved flow control of silicon valves would also be desirable. These are some of the problems this invention overcomes.

SUMMARY OF THE INVENTION

A valve assembly in accordance with an embodiment of this invention includes a valve plate and a nozzle plate which have orifices for passing fluid. Further, the valve plate has an opening for passing an actuator to deflect the nozzle plate. The valve plate and nozzle plate are not sealed to each other and operation of the valve does not depend upon the elasticity of the silicon. That is, the nozzle plate and the valve plate are separated from one another to permit fluid flow and brought together to stop fluid flow.

A spring means such as Belleville washer-type spring can be used to keep the nozzle plate in a closed position against the valve plate. This approach reduces the amount of force that the actuator must generate to open the valve in comparison to bending a silicon plate. The valve plate can be fabricated by a simultaneous double-sided etch process.

Figure 13:
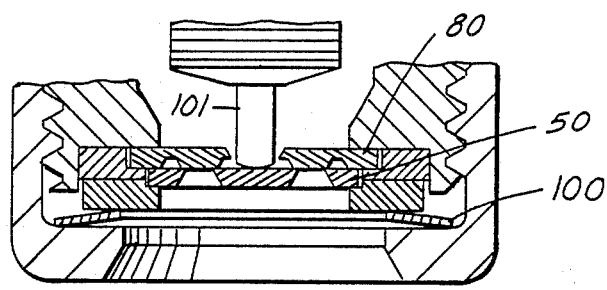
Figure 14:
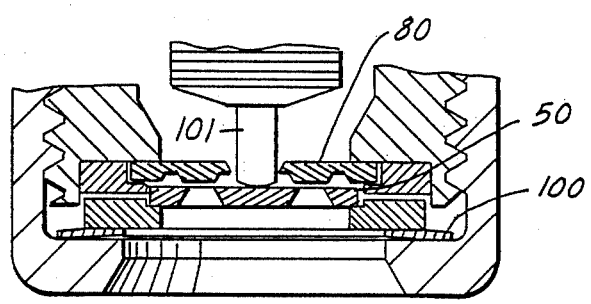

FIG. 13 is a side section view of a valve assembly in combination with a valve washer and actuator in a closed position; and FIG. 14 is the valve combination of FIG. 13 in an open position.

DETAILED DESCRIPTION OF THE INVENTION

Referring to FIGS. 1-4, a plan view of a valve plate 20 includes four flow orifices 21, a central actuating opening 22, four mesas 23 positioned around central opening 22, and four notched corners 24.

Figure 1:
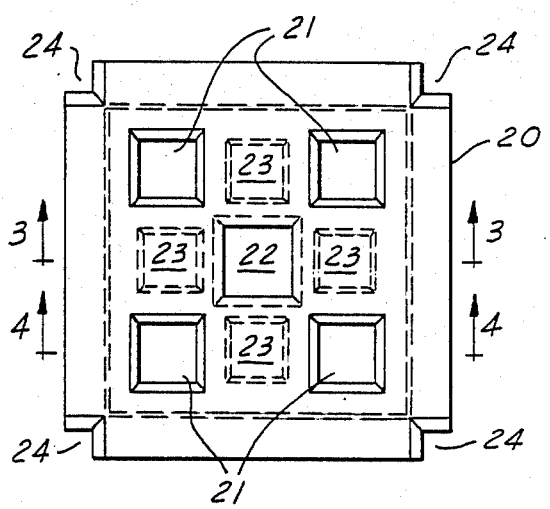
FIG. 1 is a plan view of a valve plate of a valve assembly in accordance with an embodiment of this invention.
Figure 2:
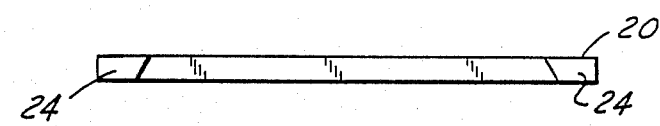
FIG. 2 is a side view of the valve plate of FIG. 1.
Figure 3:
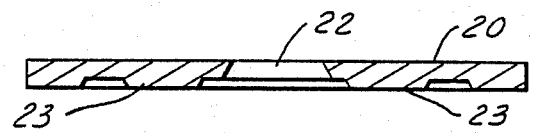
FIG. 3 is a section along line 3—3 of FIG. 1.
Figure 4:
FIG. 4 is a section along line 4—4 of FIG. 1.
Figure 5:
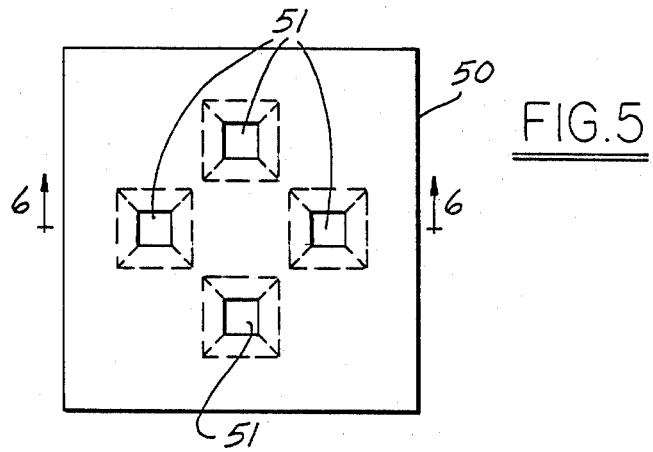
FIG. 5 is a plan view of a nozzle plate of a valve assembly in accordance with an embodiment of this invention.
Figure 6:
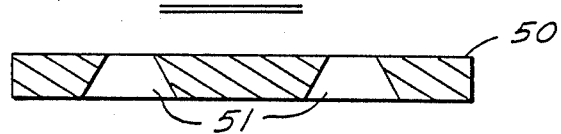
FIG. 6 is a section along line 6—6 of FIG. 5.
Figure 7:
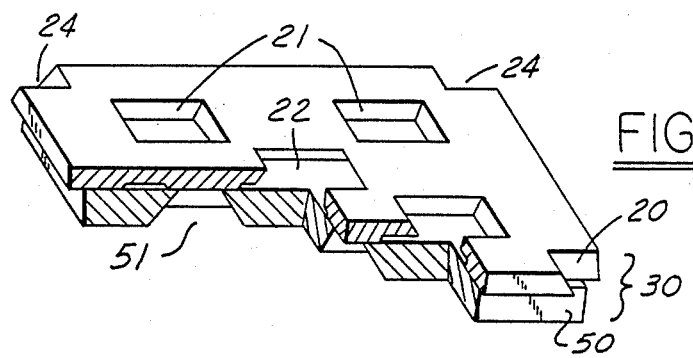
FIG. 7 is a perspective, partly broken away view of the assembly of the valve plate of FIG. 1 and the nozzle plate of FIG. 5.
Figure 8:
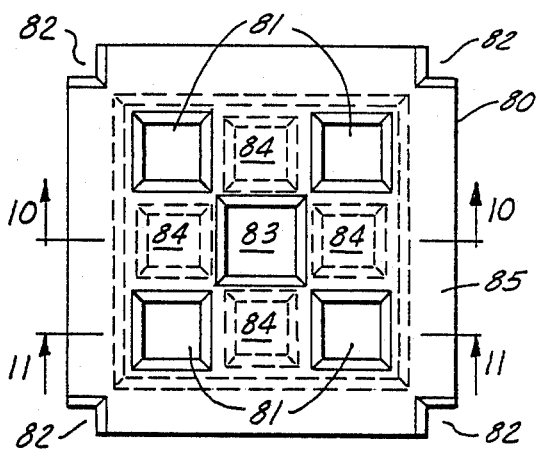
FIG. 8 is a plan view of a valve plate in accordance with another embodiment of this invention.
Figure 9:
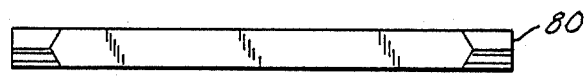
FIG. 9 is a side view of the valve plate of FIG. 8.
Figure 10:
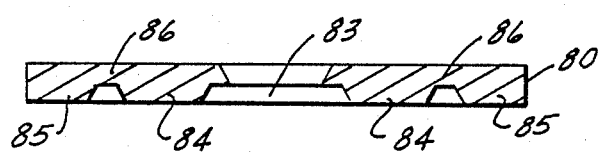
FIG. 10 is a section view along line 10—10 of FIG. 8.
Figure 11:
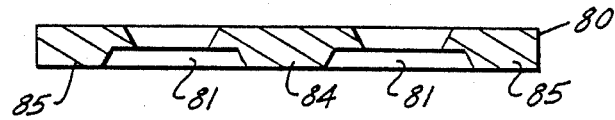
FIG. 11 is a section view along line 11—11 of FIG. 8.

Referring to FIGS. 5 and 6, a nozzle plate 50 includes four openings 51 for passing fluid and aligned with mesas 23 of valve plate 20. FIG. 7 shows the valve assembly 30 with valve plate 20 and nozzle plate 50.

Notched corners 24 of valve plate 20 are advantageous to increase the surface area of the valve. When valve plate 20 is fitted into a circular opening an advantageously large convering of the opening can be achieved by removing the corners of valve plate 20.

Referring to FIGS. 8-11. a valve plate 80 includes fabrication using double-sided etching and has flow openings 81 positioned adjacent the four corners of valve plate 80 and around a central opening 83. Double sided etching has been used to remove corners 82 from valve plate 80. A central opening 83 is surrounded by mesas 84 positioned between adjacent flow openings 81. The double-sided etching of valve plate 80 is apparent in side view FIG. 9. Valve plate 80 also includes a peripheral wall 85 and a membrane 86 positioned between peripheral wall 85 and mesas 84.

Figure 12:
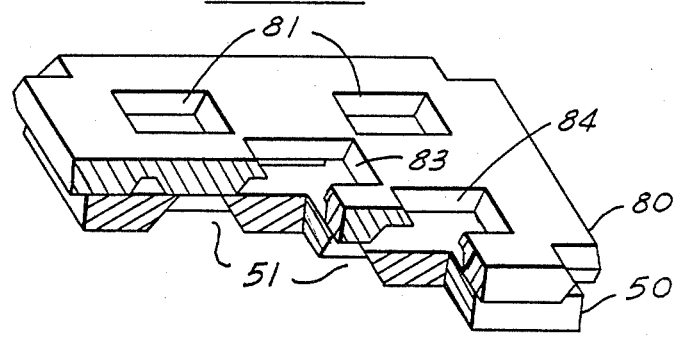
FIG. 12 is a perspective, partly broken away view of a valve assembly including the nozzle plate of FIG. 5 and the valve plate of FIG. 8 in accordance with another embodiment of this invention.

Valve plate 80 can be used with any number of nozzle plates such as nozzle plate 50 shown in FIGS. 5 and 12. FIGS. 13 and 14 show the addition of a valve washer 100 which presses valve plate 80 to nozzle plate 50 and which is deflected by an actuator 101 thereby spacing nozzle plate 50 from valve plate 80 and permitting fluid flow through the openings in nozzle plate 50. Valve washer 100 may be a Belleville washer or, alternatively, be formed of an elastomeric material.

Various modifications and variations will no doubt occur to those skilled in the art to which this invention pertains. For example, the particular size and shape of the silicon members may be varied from that disclosed herein. These and all other variations which basically rely on the teachings through which this disclosure has advanced the art are properly considered within the scope of this invention.

We claim:

1. A silicon valve assembly for controlling the flow of fluid including:
   a first generally planar silicon valve plate having side walls with two angular planes formed by doubled sided etching, a flow orifice for passing fluids, and an actuator opening.
   a second generally planar silicon nozzle plate having a planar silicon surface and nozzle orifices formed through the plane of said nozzle plate for passing fluid in a spray pattern;
   said nozzle plate and said valve plate bing free of each other at a generally parallel and adjacent position;
   a spring means for pressing said nozzle plate and valve plate toward each other thereby sealing said valve assembly to prevent fluid flow;
   an actuator means acting through said actuator opening against said nozzle plate and said spring means to separate said nozzle plate and valve plate thereby permitting fluid flow through said valve assembly; and
   wherein said valve plate is generally square plate with outside corners from which a four sided portion has been removed thereby forming a total of eight exterior corners on said valve plate.

2. A silicon valve assembly as recited in claim 1 wherein said spring means is a Belleville washer.

3. A silicon valve assembly as recited in claim 1 wherein said spring means is a elastomeric material.

4. A method for fabricating a silicon valve for controlling fluid flow including the step of forming a supply orifice in a generally planar square valve plate member, performing double-sided etching on the valve plate, and removing outside corners from the valve plate thus increasing the surface area of the valve plate which can be contained within a circle.

* * * * *